US012020213B2

(12) United States Patent
Mitchell

(10) Patent No.: US 12,020,213 B2
(45) Date of Patent: Jun. 25, 2024

(54) BENEFIT VALIDATION

(71) Applicant: ADP, Inc., Roseland, NJ (US)

(72) Inventor: Michael Mitchell, Tempe, AZ (US)

(73) Assignee: ADP, Inc., Roseland, NJ (US)

( * ) Notice: Subject to any disclaimer, the term of this patent is extended or adjusted under 35 U.S.C. 154(b) by 566 days.

(21) Appl. No.: 16/875,519

(22) Filed: May 15, 2020

(65) Prior Publication Data
US 2021/0357873 A1 Nov. 18, 2021

(51) Int. Cl.
*G06Q 40/00* (2023.01)
*G06F 3/0482* (2013.01)
*G06Q 10/1057* (2023.01)
*G06Q 40/08* (2012.01)

(52) U.S. Cl.
CPC ....... *G06Q 10/1057* (2013.01); *G06F 3/0482* (2013.01); *G06Q 40/08* (2013.01)

(58) Field of Classification Search
CPC ... G06Q 10/1057; G06Q 40/08; G06F 3/0482
USPC .......... 705/4, 3, 37, 38, 35, 2, 322, 348, 30; 235/378, 380
See application file for complete search history.

(56) References Cited

U.S. PATENT DOCUMENTS

| | | | | |
|---|---|---|---|---|
| 7,941,351 B1 * | 5/2011 | Rosenfeld | ............... | G06Q 40/12 705/30 |
| 2001/0037276 A1 * | 11/2001 | Kelly | ............... | G06Q 40/06 705/36 R |
| 2002/0069090 A1 * | 6/2002 | De Grosz | ............... | G06Q 40/08 705/4 |
| 2002/0077866 A1 * | 6/2002 | Javerlhac | ............... | G06Q 40/02 705/2 |
| 2002/0087365 A1 * | 7/2002 | Kavanaugh | ............... | G06Q 40/10 705/4 |

(Continued)

OTHER PUBLICATIONS

A decision model and support system for the optimal design of health information networks; IEEE Transactions on Systems, Man, and Cybernetics, Part C (Applications and Reviews) (vol. 31, Issue: 2, pp. 146-158); O. Berman, F. Zahedi, K.R. Pemble; May 1, 2001 . . . (Year: 2001).*

(Continued)

*Primary Examiner* — Tien C Nguyen
(74) *Attorney, Agent, or Firm* — Foley & Lardner LLP

(57) ABSTRACT

A method, apparatus, system, and computer program for verifying benefit information for an employer-provided benefit plan. A computer system verifies employee enrollments in the benefit plan. Verifying employee enrollments includes receiving an employee identifier in a first panel of a graphical user interface, identifying an employee associated with the employee identifier, identifying employee enrollments of the employee, and displaying the employee enrollments in the first panel. The computer system verifies plan benefits for the benefit plan. Verifying plan benefits includes receiving a plan identifier in a second panel of the graphical user interface, identifying the plan benefits based on the plan identifier, and displaying the plan benefits in the second panel. The computer system verifies plan membership. Verifying plan membership includes receiving a personal identifier in a third panel of the graphical user interface, identifying the plan identifier based on the personal identifier, and displaying the plan identifier in the third panel.

21 Claims, 11 Drawing Sheets

(56) References Cited

U.S. PATENT DOCUMENTS

| | | | | |
|---|---|---|---|---|
| 2002/0103678 A1* | 8/2002 | Burkhalter | G06Q 40/08 | 705/4 |
| 2002/0103679 A1* | 8/2002 | Burkhalter | H01L 24/32 | 705/4 |
| 2002/0138386 A1* | 9/2002 | Maggioncalda | G06Q 40/06 | 705/36 R |
| 2003/0088512 A1* | 5/2003 | Hoter-Ishay | G06Q 20/24 | 705/40 |
| 2003/0229522 A1* | 12/2003 | Thompson | G06Q 40/00 | 705/348 |
| 2006/0064313 A1* | 3/2006 | Steinbarth | G06Q 10/1057 | 705/322 |
| 2008/0059251 A1* | 3/2008 | Biorge | G06Q 40/08 | 705/2 |
| 2009/0192828 A1* | 7/2009 | Yunker | G06Q 40/08 | 705/4 |
| 2016/0063637 A1* | 3/2016 | Nelson | G06Q 40/08 | 705/4 |
| 2017/0255999 A1* | 9/2017 | Amaral | G06Q 40/08 | |

OTHER PUBLICATIONS

The design of employment information recommendation system; 2016 First IEEE International Conference on Computer Communication and the Internet (ICCCI) (pp. 480-484); Chen Li, Cheng Yang; Oct. 13, 2016. (Year: 2016).*

* cited by examiner

FIG. 11

PDM Viewer

Access plan specific information, coverage tier cost, and plan data setup information Click here for the video training guide

*Please select first the Provider, then Plan Code or Plan Name, and finally the Rate Level*

1. Provider [    ]
   Plan Code [    ]
   Or
2. Plan Name [    ]
3. Rate Level [    ]

View PDM_Calc File

Benefit Plan ID _____   Carrier Group _____

Policy Number _____   Carrier Subgroup _____

** *Amounts listed below are the total monthly premium cost per coverage tier***

Employee Only _____   Empl + Spouse _____

Empl + Children _____   Empl + Family _____

Plan Data Information

Coverage Description | In Network | Out of Network

| Verify Enrollment | PDM Viewer | UHC Enrollment | ID Cards | Carrier Info |

FIG. 12

ID Cards | Carrier Info

Carrier contact information | Green can be shared with WSE's, Red is only shared with ADP Click here for the video training guide

| Select Carrier | Member Customer Service | Additional Contacts | |
|---|---|---|---|
| Regence (OR and WA) ▾ | Member Services Oregon<br>• 888-367-5555<br>Group# 10014979<br>✚<br>Member Services Washington<br>• 888-367-5556<br>Group# 10019027 | Service Contact<br>adp_service@uhc.com | Mobile App<br>Empower<br>Website<br>https://www.regence.com |

ADP Internal Contacts
**\*\*Do Not Share with Employees\*\***

Eligibility and Emergency
Enrollments for Oregon
Jane Doe
800-555-6801 x 5555
Jane.Doe@regence.com Eligibility and Emergency
Enrollments for Washington
Mary Lee
800-555-6801 x 5556
Mary.Lee@regence.com

- Coordinate member outreach calls
- Claims \*\*Simple Claim Issues can be resolved within 24 hours\*\*
- Commissions
- Pharmacy Issues
- Platform conversion issues outside of the renewal
- Missing member package or admin kits
- Provider directories
- System feed issues
- Benefit questions (post-installation)
- United Benefit Services/UBS

| Verify Enrollment | PDM Viewer | UHC Enrollment | ID Cards | Carrier Info |

FIG. 14

BENEFIT VALIDATION

BACKGROUND INFORMATION

1. Field

The present disclosure relates generally to an improved system and method, which can be embodied in an apparatus, computer system, or computer program product, for providing visual verification of electronic data.

2. Background

An employer provides employee benefits to its employees according to a benefits plan that includes different types of plans for the various employees. For example, an employer may provide health insurance to its employees based on an insurance plan that is offered at different rates to the various employees. As one specific example, a particular insurance plan may be offered at a first rate for an individual employee, a second rate for an employee and the employee's spouse, a third rate for an employee and the employee's children, and a fourth rate for an employee and the employee's entire family including spouse and children.

Insurance plans can be complex and many insurance providers provide a variety of insurance plans from which an employer can choose. For example, without limitation, insurance plans may vary based on whether the coverage is limited to a Health Maintenance Organization (HMO) or a Preferred Provider Organization (PPO). As another example, insurance plans may vary based on deductibles, the percentage of carrier coinsurance, the percentage of member coinsurance, and other features.

Thus, there may be many considerations for the employer to take into account when managing a benefits plan for its employees. However, accessing the information needed to make a well-informed selection may be more tedious, difficult, and time-consuming than desired. In some cases, this information may not be readily available or easily acquirable.

SUMMARY

An embodiment of the present disclosure provides a method for verifying benefit information for an employer-provided benefit plan. A computer system verifies employee enrollments in the benefit plan. Verifying employee enrollments includes receiving an employee identifier in a first panel of a graphical user interface, identifying an employee associated with the employee identifier, identifying employee enrollments of the employee, and displaying the employee enrollments in the first panel. The computer system verifies plan benefits for the benefit plan. Verifying plan benefits includes receiving a plan identifier in a second panel of the graphical user interface, identifying the plan benefits based on the plan identifier, and displaying the plan benefits in the second panel. The computer system verifies plan membership. Verifying plan membership includes receiving a personal identifier in a third panel of the graphical user interface, identifying the plan identifier based on the personal identifier, and displaying the plan identifier in the third panel.

Another embodiment of the present disclosure provides a computer system and a benefit verifier in the computer system. The benefit verifier operates to verify employee enrollments in the benefit plan. Verifying employee enrollments includes receiving an employee identifier in a first panel of a graphical user interface, identifying an employee associated with the employee identifier, identifying employee enrollments of the employee, and displaying the employee enrollments in the first panel. The benefit verifier operates to verify plan benefits for the benefit plan. Verifying plan benefits includes receiving a plan identifier in a second panel of the graphical user interface, identifying the plan benefits based on the plan identifier, and displaying the plan benefits in the second panel. The benefit verifier operates to verify plan membership. Verifying plan membership includes receiving a personal identifier in a third panel of the graphical user interface, identifying the plan identifier based on the personal identifier, and displaying the plan identifier in the third panel.

Yet another embodiment of the present invention provides computer program product for verifying benefit information for an employer-provided benefit plan, the computer program product comprising a computer readable storage media with program code stored on the computer-readable storage media. The program code includes first instructions for verifying employee-enrollments in the benefit plan. The first instructions include instructions for receiving an employee-identifier in a first panel of a graphical user interface, for identifying an employee associated with the employee-identifier, for identifying employee-enrollments of the employee, and for displaying the employee-enrollments in a first panel of a graphical user interface. The program code includes second instructions for verifying plan benefits for the benefit plan. The second instructions include instructions for receiving a plan-identifier in a second panel of the graphical user interface, for identifying the plan benefits based on the plan-identifier, and for displaying the plan benefits in the second panel of the graphical user interface. The program code includes third instructions for verifying plan membership. The third instructions include instructions for receiving a personal-identifier in a third panel of the graphical user interface, for identifying the plan-identifier based on the personal-identifier, and for displaying the plan-identifier in the third panel of the graphical user interface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of a first panel of a benefit verification system in accordance with an illustrative embodiment;

FIG. 12 is an illustration of a second panel of a benefit verification system in accordance with an illustrative embodiment;

FIG. 14 is an illustration of a fourth panel of a benefit verification system in accordance with an illustrative embodiment.

DETAILED DESCRIPTION

The illustrative embodiments recognize and take into account one or more different considerations. For example, the illustrative embodiments recognize and take into account that employers often provide a package of benefits to employees as part of their employment compensation.

Illustrative embodiments also recognize and take into account that the design, creation, and customization of benefit plans is a very people-centric, insight-based, human-interaction-driven process. Typically, benefit planning depends solely on the knowledge of the plan provider, without access to centralized aggregated data. Negotiation with different benefit providers, clients, agencies, and unions increases the time and energy spent to ensure that plan benefits comply with complex regulations of different relevant regulatory agencies.

An embodiment of the present disclosure provides a method for verifying benefit information for an employer-provided benefit plan. A computer system verifies employee enrollments in the benefit plan. Verifying employee enrollments includes receiving an employee identifier in a first panel of a graphical user interface, identifying an employee associated with the employee identifier, identifying employee enrollments of the employee, and displaying the employee enrollments in the first panel. The computer system verifies plan benefits for the benefit plan. Verifying plan benefits includes receiving a plan identifier in a second panel of the graphical user interface, identifying the plan benefits based on the plan identifier, and displaying the plan benefits in the second panel. The computer system verifies plan membership. Verifying plan membership includes receiving a personal identifier in a third panel of the graphical user interface, identifying the plan identifier based on the personal identifier, and displaying the plan identifier in the third panel.

Figure 1:
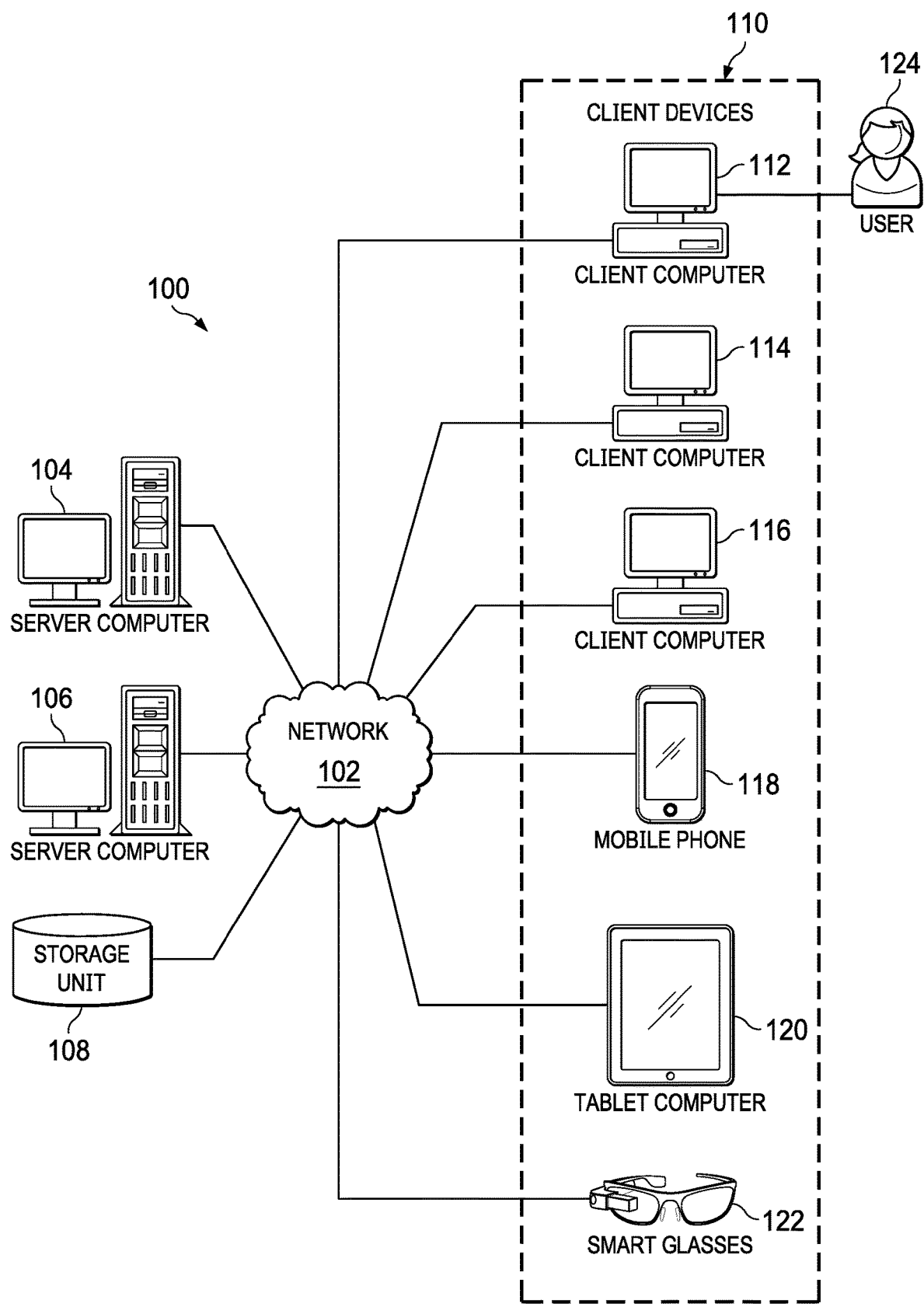
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are client to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
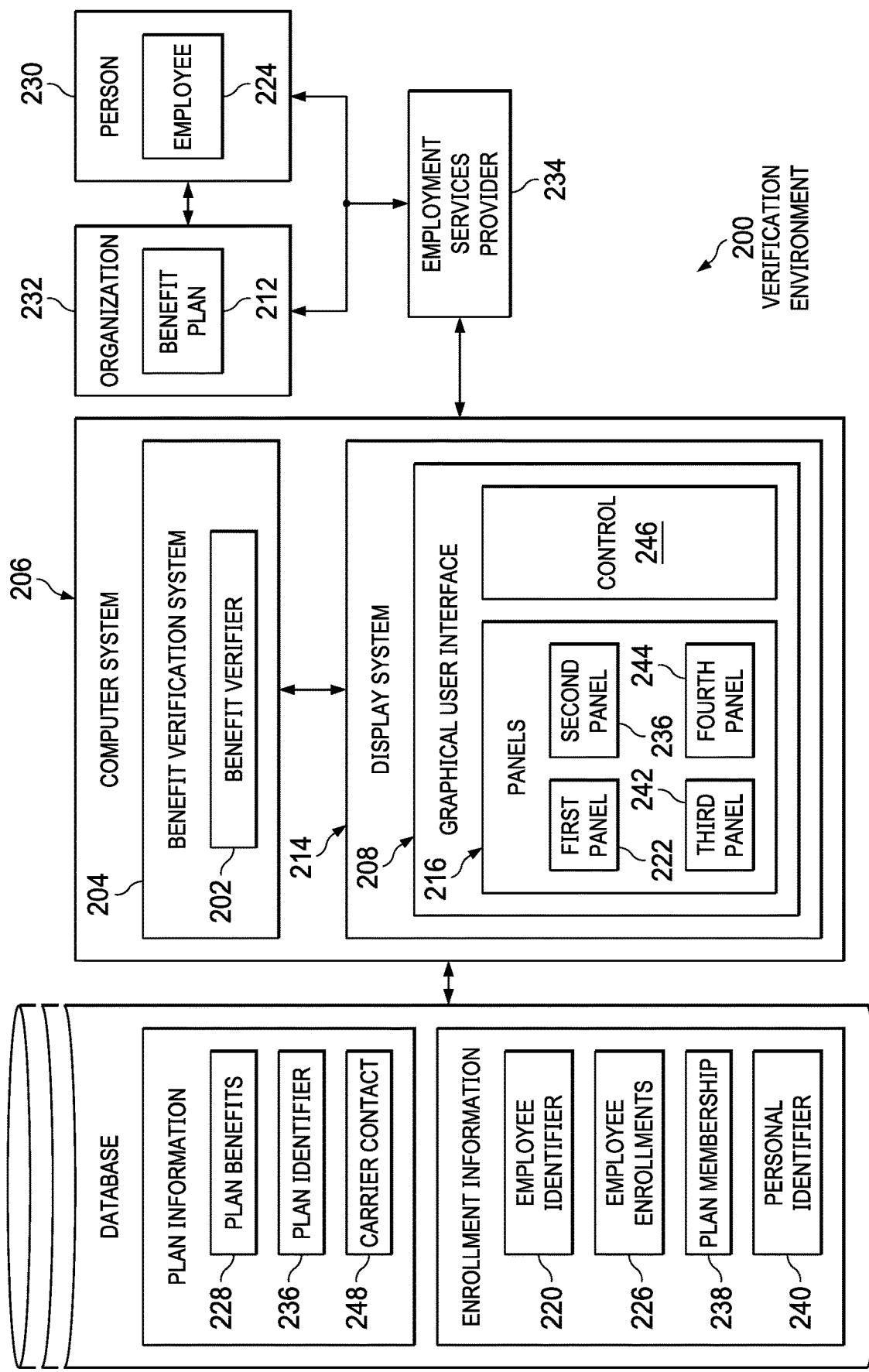
FIG. 2 is a block diagram of a verification environment in accordance with an illustrative embodiment.

With reference now to FIG. 2, a block diagram of a verification environment is depicted in accordance with an illustrative embodiment. In this illustrative example, verification environment 200 includes components that can be implemented in hardware such as the hardware shown in network data processing system 100 in FIG. 1.

As depicted, verification environment 200 is an environment in which benefit verifier 202 enables benefit verification system 204 in computer system 206 to provide services for providing visual verification of electronic document 126.

Computer system 206 is a physical hardware system and includes one or more data processing systems. When more than one data processing system is present in computer system 206, those data processing systems are in communication with each other using a communications medium. The communications medium may be a network. The data processing systems may be selected from at least one of a computer, a server computer, a tablet, or some other suitable data processing system.

In this illustrative example, benefit verifier 202 and computer system 206 form benefit verification system 204. Benefit verifier 202 can verify benefit information for an employer-provided benefit plan, thereby enabling benefit verification system 204 to provide graphical user interface 208 that improves visualization of both plan information and enrollment information. Graphical user interface 208 provides a more intuitive and friendly interface that enables a reduction in both data entry errors when setting up benefit plans and a reduction in case resolution times for service calls. Additionally, graphical user interface 208 makes it easier for business service specialists to input the necessary data to ensure that plans are billed properly and payments is remitted to carriers.

Benefit verifier 202 can be implemented in software, hardware, firmware, or a combination thereof. When software is used, the operations performed by benefit verifier 202 can be implemented in program code configured to run on hardware, such as a processor unit. When firmware is used, the operations performed by benefit verifier 202 can be implemented in program code and data and stored in persistent memory to run on a processor unit. When hardware is employed, the hardware may include circuits that operate to perform the operations in benefit verifier 202.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In this illustrative example, benefit verification system 204 verifies employee-enrollments 210 in the benefit plan 212. In one illustrative example, benefit verification system enables verification of employee enrollments 210 by displaying graphical user interface 208 on display system 214.

Graphical user interface 208 is an interface that enables users to interact with benefit verification system 204 through graphical elements, such as windows, icons and buttons, rather than text-based user interfaces, typed command labels or text navigation. Graphical user interface 208 can include one or more graphical control elements, such as tabs (not shown), that enable navigation between one or more panels 216 contained within a browser window. Each of panels 216 is a particular arrangement of graphical elements information grouped together for accessing and presenting plan information 218.

Benefit verification system 204 can display graphical user interface 208 on display system 214. Display system 214 can include one or more display devices, selected from one of a liquid crystal display (LCD), a light emitting diode (LED) display, an organic light emitting diode (OLED) display, and other suitable types of display devices.

In this illustrative example, benefit verification system 204 verifies employee-enrollments 210 by receiving employee-identifier 220 in first panel 222 of graphical user interface 208. Benefit verification system 204 identifies employee 224 associated with the employee-identifier 220, and employee-enrollments 226 of the employee 224. benefit verification system 204 displays the employee-enrollments 226 in first panel 222 of graphical user interface 208.

In one illustrative example, graphical user interface 208 includes one or more control 246. As used herein, a "control" is a graphical and/or functional element that can be reused across graphical user interface (GUI) applications and which the user can select and activate to get additional information. A control, in a graphical user interface, is an object on the screen that can be manipulated by the user to perform some action. A button is a common type of control.

In this illustrative example, benefit verification system 204 receives user input selecting control 246 in the first panel 222. Benefit verification system 204 displays employee enrollments 226 in response to receiving the user input.

Employee identifier 220 is a unique identifier that identifies person 230 as employee 224 in the context of organization 232. For example, Employee identifier 220 can be a name of employee 224, a position of employee 224 within organization 232, and a status of employee 224, as well as other identifiers. A status of employee 224 can be, for example, full-time, part-time, salaried, hourly, as well as other statuses.

Employee enrollments 226 are plan benefits 228 of benefit plan 212 that are elected by employee 224. For example, plan benefits 228 may include housing allowances, health insurance, life insurance, dental insurance, disability income protection, retirement benefits, sick leave, and vacation (paid and unpaid), as well as other suitable benefits. Employee enrollments 226 may designate one or more plan benefits 228, including coverage elections or employee contributions thereto.

First panel 222 of graphical user interface 208 enables benefit verification system 204 to efficiently verify that employee-enrollments 226 are created and active for employee 224 in a given plan year. First panel 222 enables benefit service specialist 234 to view active enrollments without the need of going back and forth between screens. Using benefit verifier 202 in conjunction with first panel 222 enables a reduction in Open Enrollment Client Configuration case resolution time down of about 75% as compared to a manual process of verifying enrollment using known systems of the prior art.

In this illustrative example, benefit verification system 204 verifies plan benefits 228 for the benefit plan 212 by receiving a plan-identifier 236 in a second panel 236 of the graphical user interface 208. Benefit verification system 204 identifies plan benefits 228 based on the plan-identifier 236. Benefit verification system 204 displays the plan benefits 228 in the second panel 236 of the graphical user interface 208.

plan-identifier 236 is one or more identifiers that can uniquely identify plan benefits 228 of benefit plan 212. For example, plan identifier 236 can include information such as provider name, a plan code or plan name, a rate level associated with benefit plan 212. plan-identifier 236 enables business service specialist 234 to access plan specific information, including coverage to your cause and plan data set up information.

Second panel 236 of graphical user interface 208 provides benefit service specialist 234 with plan specific information when setting up or verifying benefit plan 212. Second panel 236 provides a simplified view of plan benefits 228 with plan data specific to benefit plan 212. Second panel 236 enables easier input the necessary data by business service specialist 234 to ensure that plans are billed properly and payments are remitted to carriers.

In this illustrative example, benefit verification system 204 verifies plan membership 238 by receiving a personal identifier 240 in a third panel of the graphical user interface 208. benefit verification system 204 identifies the plan-identifier 236 based on the personal identifier 240. benefit verification system 204 displays the plan-identifier 236 in the third panel 242 of graphical user interface 208.

personal identifier 240 is information that can uniquely identify person 230 outside of the context of organization 232. For example, personal identifier 240 can be a name, Social Security number, driver's license number, bank account number, passport number, or email address, as well as other possible identifiers.

Third panel 242 of graphical user interface 208 enables benefit service specialist 234 to access plan membership 238 using personal identifier 240. Third panel 242 provides benefit service specialist 234 with enrollment-specific information for person 230.

In one illustrative embodiment, third panel 242 may also provide the ability to mass-verify enrollments for multiple employees of organization 232. Verification of enrollments can enable benefit service specialist 234 to more quickly address multiple enrollment issues or inquiries when contacted by client benefit administrators of organization 232.

In one illustrative example, graphical user interface 208 includes fourth panel 244. benefit verification system 204 identifies carrier contact information 248 based on information received in the first panel 222, second panel 236, third panel 242, or combinations thereof. benefit verification system 204 displays carrier contact information 248 in fourth panel 244 of graphical user interface 208.

Benefit verifier 202 improves customer service by increasing the likelihood of one call resolution while also improving data accuracy across all markets. Additional, Benefit verifier 202 reduces the likelihood of downstream cases due to wrong or incorrectly worked plan benefits and employee enrollments therein.

Further, benefit verifier 202 overcomes a technical problem of verifying benefit information for an employer-provided benefit plan. In one illustrative example, providing a verifying benefit information for an employer-provided benefit plan enables a business service specialist to more quickly and easily resolve issues due to automatic write over employee enrollments from a prior plan year.

Figure 3:
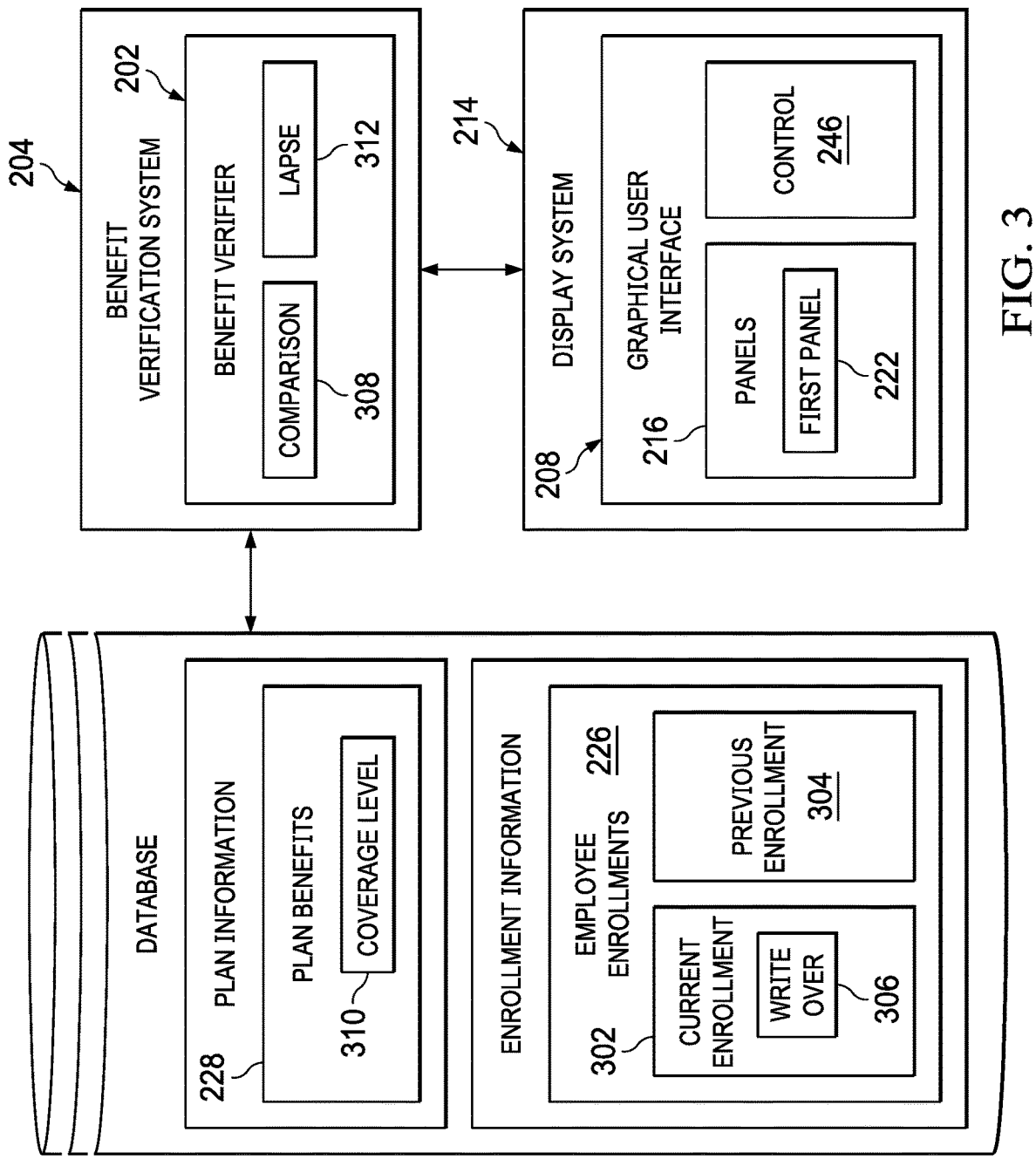
FIG. 3 is a data flow diagram illustrating data flow for verifying benefit information for an employer-provided benefit plan in accordance with an illustrative embodiment.

With reference next to FIG. 3, a data flow diagram illustrating data flow for verifying benefit information for an employer-provided benefit plan is depicted in accordance with an illustrative embodiment. In the illustrative examples, the same reference numeral may be used in more than one figure. This reuse of a reference numeral in different figures represents the same element in the different figures.

In this illustrative example, benefit verifier 202 compares employee enrollments 226 before changes are made against after changes are implemented. In this illustrative example, employee enrollments 226 includes current enrollment 302 and previous enrollment 304.

Benefit verification system 204 identifies previous enrollment 304. Previous enrollment 304 is employee enrollments 226 of employee 224 in the benefit plan 212, both shown in FIG. 2, prior to a change in employee enrollments 226. Changes can be made, for example by a Benefit Service Specialist (BSS) or during write-over 306 of employee enrollments 226 to a new plan year at Open Enrollment.

Benefit verification system 204 identifies current enrollment 302 of employee 224 in the benefit plan 212, and displays comparison 308 between the current enrollment 300 to and the previous enrollment 304. Comparison 308 is displayed first panel 222 of graphical user interface 226. By displaying comparison 308, benefit verification system 200 for enables a benefit service specialist to verify that employee enrollments 226 remain active after changes have been made, whether by a Benefit Service Specialist (BSS) or during write-over process at Open Enrollment.

In one illustrative example, graphical user interface 226 includes control 246. Benefit verification system 204 receiving user input selecting control 246 in the first panel 222, and displays comparison 308 in response to receiving the user input.

In one illustrative example, identifying employee enrollments includes identifying coverage level 310 elected by employee 224. Benefit verification system 204 identifies a coverage level 310 for previous enrollment 304, and identifies a coverage level 310 for current enrollment 302. Benefit verification system 204 displays comparison 308 including a comparison between the coverage level 310 of current enrollments 302 and coverage level 310 of previous enrollment 304.

In one illustrative example, benefit verification system 204 generates current enrollment 302 by performing a write-over 306 of the previous enrollment 304 of a prior plan year. Benefit verification system 204 identifies A lapse 312 in the employee enrollments 226 caused by the write-over 306.

In this illustrative example, benefit verification system 204 displays comparison 308 between the coverage level 310 of current enrollments 302 and coverage level 310 of previous enrollment 304 including the lapse 312 in the employee enrollments 206. Benefit verification system 204 displays lapse 312 in first panel 222 of the graphical user interface 226.

In this manner, Computer system 206 of FIG. 2 can be configured to perform at least one of the steps, operations, or actions described in the different illustrative examples using software, hardware, firmware, or a combination thereof. As a result, computer system 206 operates as a special purpose computer system in which benefit verifier 202 in computer system 206 enables verifying benefit information for an employer-provided benefit plan. In particular, benefit verifier 202 transforms computer system 206 into a special purpose computer system as compared to currently available general computer systems that do not have benefit verifier 202.

In the illustrative example, the use of benefit verifier 202 in computer system 206 integrates processes into a practical application for verifying benefit information for an employer-provided benefit plan in a manner that increases the performance of computer system 206. For example, benefit verifier 202 overcomes a technical problem of verifying benefit information for an employer-provided benefit plan. In one illustrative example, providing a verifying benefit information for an employer-provided benefit plan enables a business service specialist to more quickly and easily resolve issues due to automatic write over employee enrollments from a prior plan year.

In other words, benefit verifier 202 in computer system 206 is directed to a practical application of processes integrated into benefit verifier 202 in computer system 206 that provides verification of benefit information for an employer-provided benefit plan. As a result, Benefit verifier 202 improves customer service by increasing the likelihood of one call resolution while also improving data accuracy across all markets. Additional, Benefit verifier 202 reduces the likelihood of downstream cases due to wrong or incorrectly worked plan benefits and employee enrollments therein.

The illustration of verification environment 200 in FIGS. 2-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
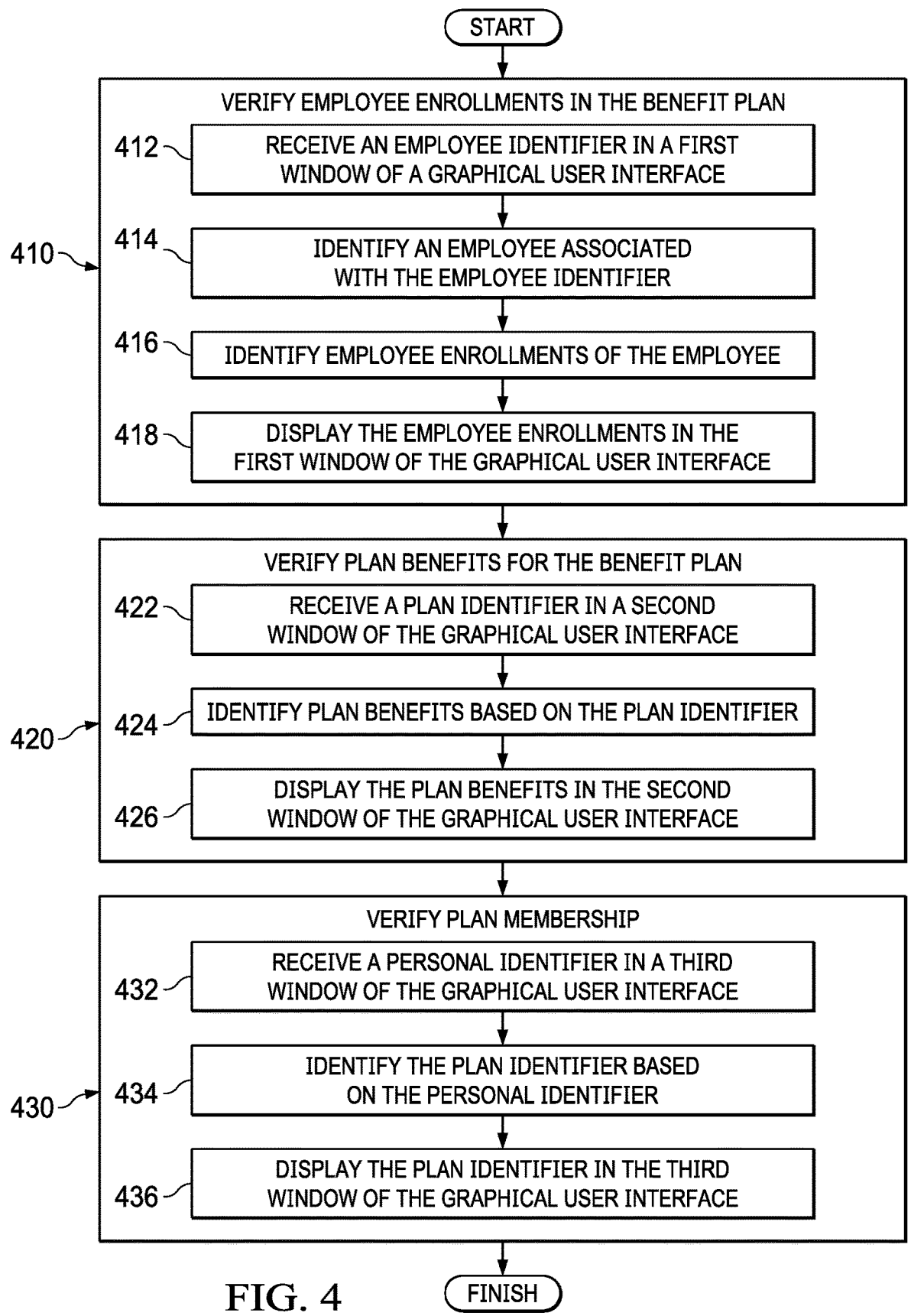
FIG. 4 is a flowchart of a process for verifying benefit information for an employer-provided benefit plan in accordance with an illustrative embodiment.

Turning next to FIG. 4, a flowchart of a process for verifying benefit information for an employer-provided benefit plan is depicted in accordance with an illustrative embodiment. The process in FIG. 4 can be implemented in hardware, software, or both. When implemented in software, the process can take the form of program code that is run by one or more processor units located in one or more hardware devices in one or more computer systems. For example, the process can be implemented in benefit verifier 202 in computer system 206 in FIG. 2.

The process verifies employee enrollments in the benefit plan (step 410). In verifying employee enrollments, the process receives an employee identifier in a first panel of a graphical user interface (step 412), identifies an employee associated with the employee identifier (step 414), identifies employee enrollments of the employee (step 416), and displays the employee enrollments in the first panel (step 418).

The process verifies plan benefits for the benefit plan (step 420). In verifying plan benefits, the process receives a plan identifier in a second panel of the graphical user interface (step 422), identifies the plan benefits based on the plan identifier (step 424), and displays the plan benefits in the second panel (step 426).

Figure 5:
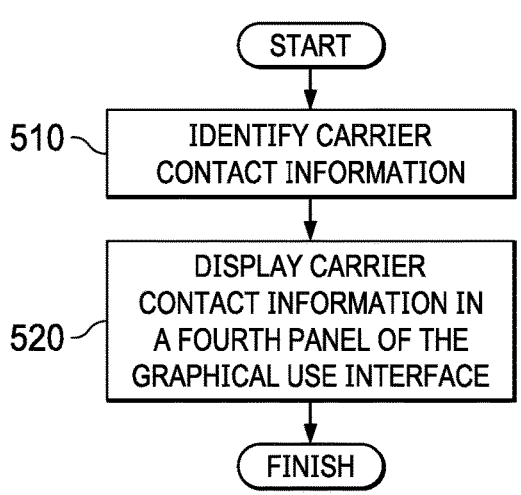
FIG. 5 is a flowchart of a process for identifying and displaying the carrier contact information in accordance with an illustrative embodiment.

The process verifies plan membership (step 430). In verifying plan membership, the process receives a personal identifier in a third panel of the graphical user interface (step 432), identifies the plan identifier based on the personal identifier (step 434), and displays the plan identifier in the third panel (step 436). The process terminates thereafter Turning next to FIG. 5, a flowchart of a process for identifying and displaying the carrier contact information is depicted in accordance with an illustrative embodiment. The process in FIG. 5 can be implemented in benefit verifier 202 in computer system 206 in FIG. 2 in conjunction with the process of FIG. 4.

The process begins by identifying carrier contact information (step 510). The carrier contact information can be identified based on information received in graphical user interface 208 in the first panel 222, the second panel 236, the third panel 242, or combinations thereof.

The process displays the carrier contact information and a fourth panel of the graphical user interface (step 520). The process terminates thereafter.

Figure 6:
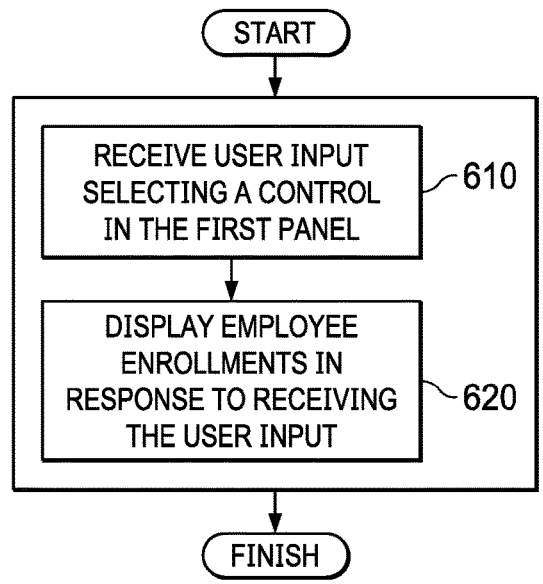
FIG. 6 is a flowchart of a process for identifying and displaying the employee enrollments in accordance with an illustrative embodiment.

Turning next to FIG. 6, a flowchart of a process for identifying and displaying the employee enrollments is depicted in accordance with an illustrative embodiment. The process in FIG. 6 is an example of one manner in which step 410 in FIG. 4 can be implemented.

Continuing from step 430 of FIG. 4, the process receives user input selecting a control in the first panel (step 610). The process displays employee enrollments in response to receiving the user input (step 620). Thereafter, the process proceeds to step 420 of FIG. 4.

Figure 7:
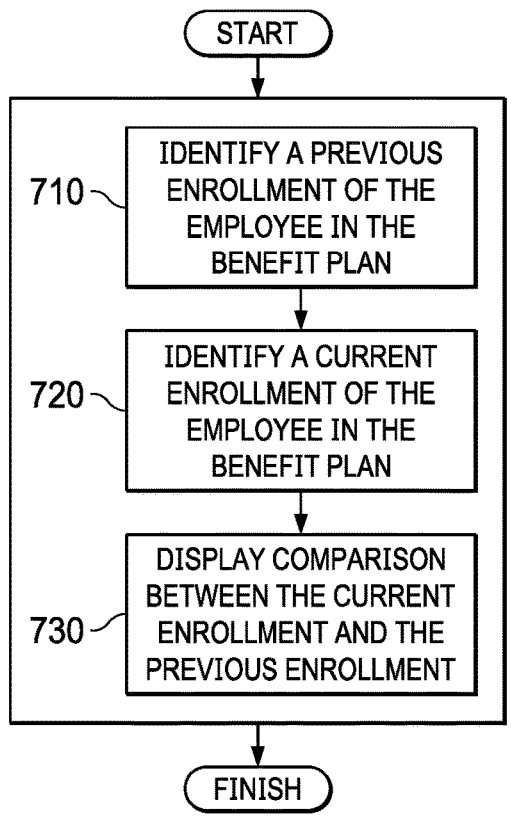
FIG. 7 is a flowchart of a process for identifying and displaying a comparison between employee enrollments in accordance with an illustrative embodiment.

Turning next to FIG. 7, a flowchart of a process for identifying and displaying a comparison between employee enrollments is depicted in accordance with an illustrative embodiment. The process in FIG. 7 is an example of one manner in which steps 416 and 418 in FIG. 4 can be implemented.

Continuing from step 414, the process identifies a previous enrollment of the employee in the benefit plan (step 710). The process identifies a current enrollment of the employee in the benefit plan (step 720). The process displays a comparison between the current enrollment and the previous enrollment (step 730), and thereafter proceeds to step 420 of FIG. 4.

Figure 8:
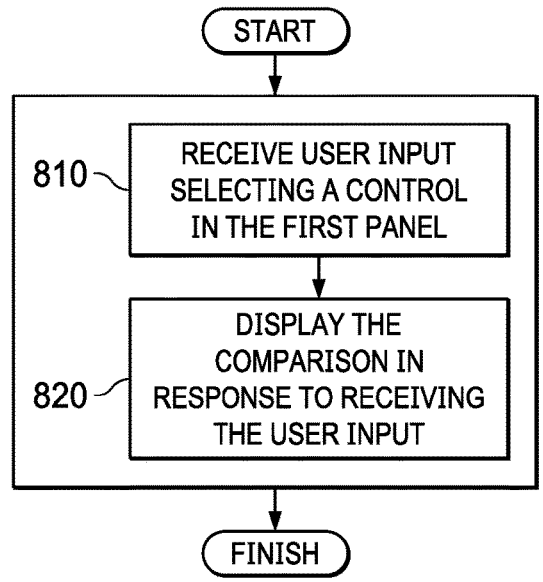
FIG. 8 is a flowchart of another process for identifying and displaying the comparison between employee enrollments in accordance with an illustrative embodiment.

Turning next to FIG. 8, a flowchart of another process for identifying and displaying the comparison between employee enrollments is depicted in accordance with an illustrative embodiment. The process in FIG. 8 is an example of one manner in which step 730 in FIG. 7 can be implemented.

Continuing from step 720, the process receives user input selecting a control in the first panel (step 810). The process displays the comparison in response to receiving the user input (step 620). Thereafter, the process proceeds to step 420 of FIG. 4.

Figure 9:
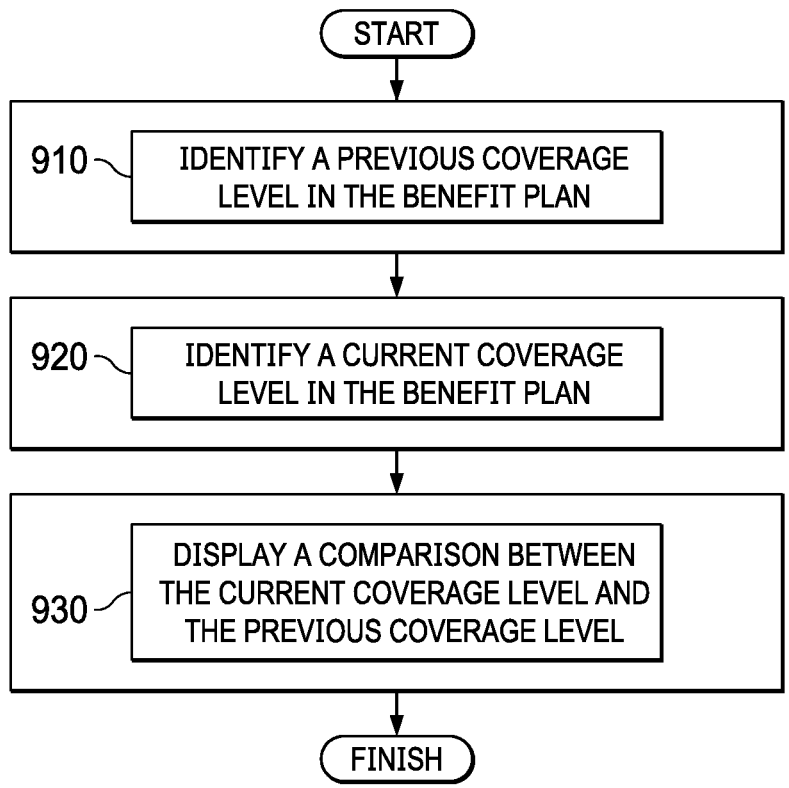
FIG. 9 is a flowchart of a process for identifying and displaying a comparison between coverage levels in accordance with an illustrative embodiment.

Turning next to FIG. 9, a flowchart of a process for identifying and displaying a comparison between coverage levels is depicted in accordance with an illustrative embodiment. The process in FIG. 9 is an example of one manner in which the process illustrated in FIG. 7 can be implemented.

As part of step 710, the process identifies a previous coverage level in the benefit plan (step 910). As part of step 720, the process identifies a current coverage level in the benefit plan (step 920). As part of step 730, the process displays a comparison between the current coverage level and the previous coverage level (step 930), and thereafter proceeds to step 420 of FIG. 4.

Figure 10:
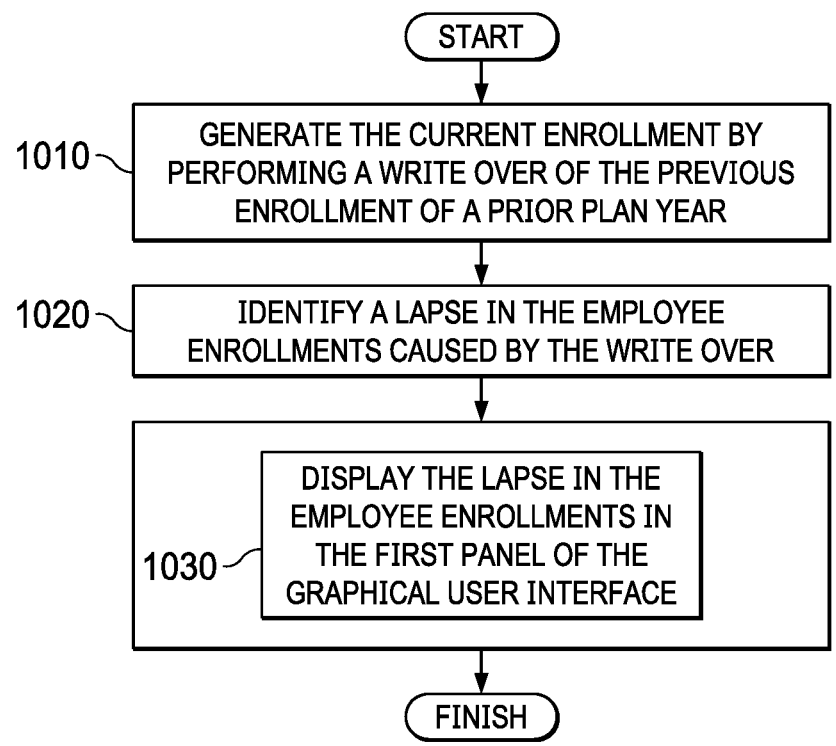
FIG. 10 is a flowchart of a process for identifying and displaying a lapse in the employee enrollments in accordance with an illustrative embodiment.

Turning next to FIG. 10, a flowchart of a process for identifying and displaying a lapse in the employee enrollments is depicted in accordance with an illustrative embodiment. The process in FIG. 10 can be implemented in benefit verifier 202 in computer system 206 in FIG. 2 in conjunction with the process of FIG. 7.

The process generates the current enrollment by performing a write over of the previous enrollment of a prior year plan (step 1010). The process then identifies a lapse in the employee enrollments caused by the write over (step 1020).

As part of step 730, the process displays the lapse in the employee enrollments in the first panel of the graphical user interface (step 1030). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
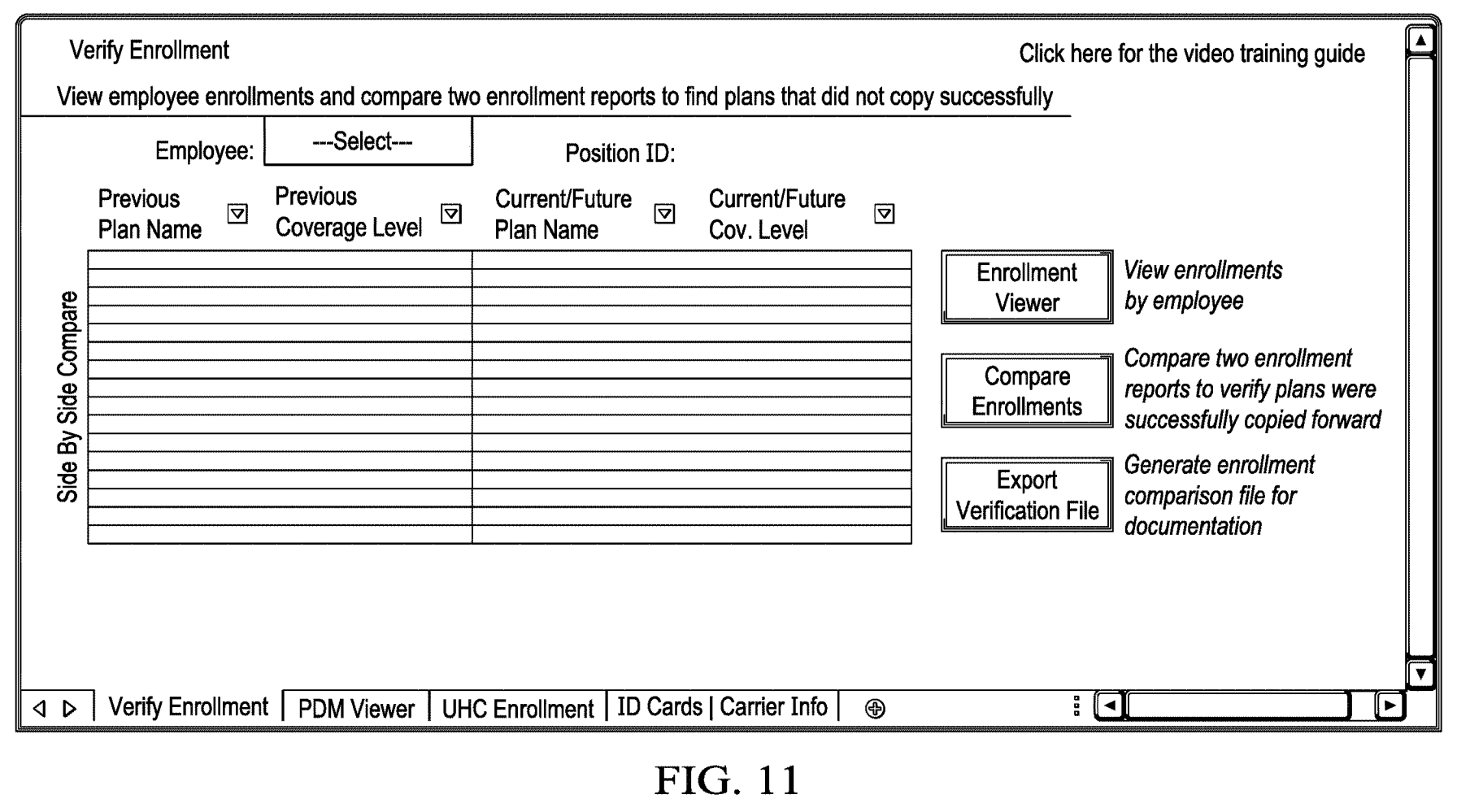

Turning next to FIG. 11, an illustration of a first panel of a benefit verification system is depicted in accordance with an illustrative embodiment. First panel 1100 is one example of first panel 222, shown in block form in FIG. 2.

First panel 1100 enables the efficient verification of employee-enrollments that are created and active for an employee in a given plan year. First panel 1100 enables a benefit service specialist to view active enrollments without the need of going back and forth between screens. When implemented in a benefit verifier, such as benefit verifier 202 of FIG. 2, first panel 1100 enables a reduction in Open Enrollment Client Configuration case resolution time down of about 75% as compared to a manual process of verifying enrollment using known systems of the prior art.

Turning next to FIG. 12, an illustration of a second panel of a benefit verification system is depicted in accordance with an illustrative embodiment. Second panel 1200 is one example of second panel 236, shown in block form in FIG. 2.

Second panel 1200 access to plan specific information when setting up or verifying a benefit plan. Second panel 1200 provides a simplified view of plan benefits with plan data specific to benefit plan. When implemented in a benefit verifier, such as benefit verifier 202 of FIG. 2, second panel 1200 enables easier input and access to the necessary data to ensure that plans are billed properly and payments are remitted to carriers.

Figure 13:
FIG. 13 is an illustration of a third panel of a benefit verification system in accordance with an illustrative embodiment.

Turning next to FIG. 13, an illustration of a third panel of a benefit verification system is depicted in accordance with an illustrative embodiment. Third panel 1300 is one example of third panel 242, shown in block form in FIG. 2.

Third panel 1300 enables access to plan membership information using a person's personal identifying information. When implemented in a benefit verifier, such as benefit verifier 202 of FIG. 2, third panel 242 provides enrollment-specific information based on personal information that may be outside the employer/employee context. Third panel 1300 also provides the ability to mass-verify enrollments for multiple employees of organization, enabling efficient resolution of multiple enrollment issues or inquiries received from client benefit administrators.

Turning next to FIG. 14, an illustration of a fourth panel of a benefit verification system is depicted in accordance with an illustrative embodiment. Fourth panel 1400 is one example of fourth panel 244, shown in block form in FIG. 2. Fourth panel 1400 displays carrier contact information based on information received in one or more of first panel 1100 of FIG. 11, second panel 1200 of FIG. 12, and third panel 1300 of FIG. 13.

Figure 15:
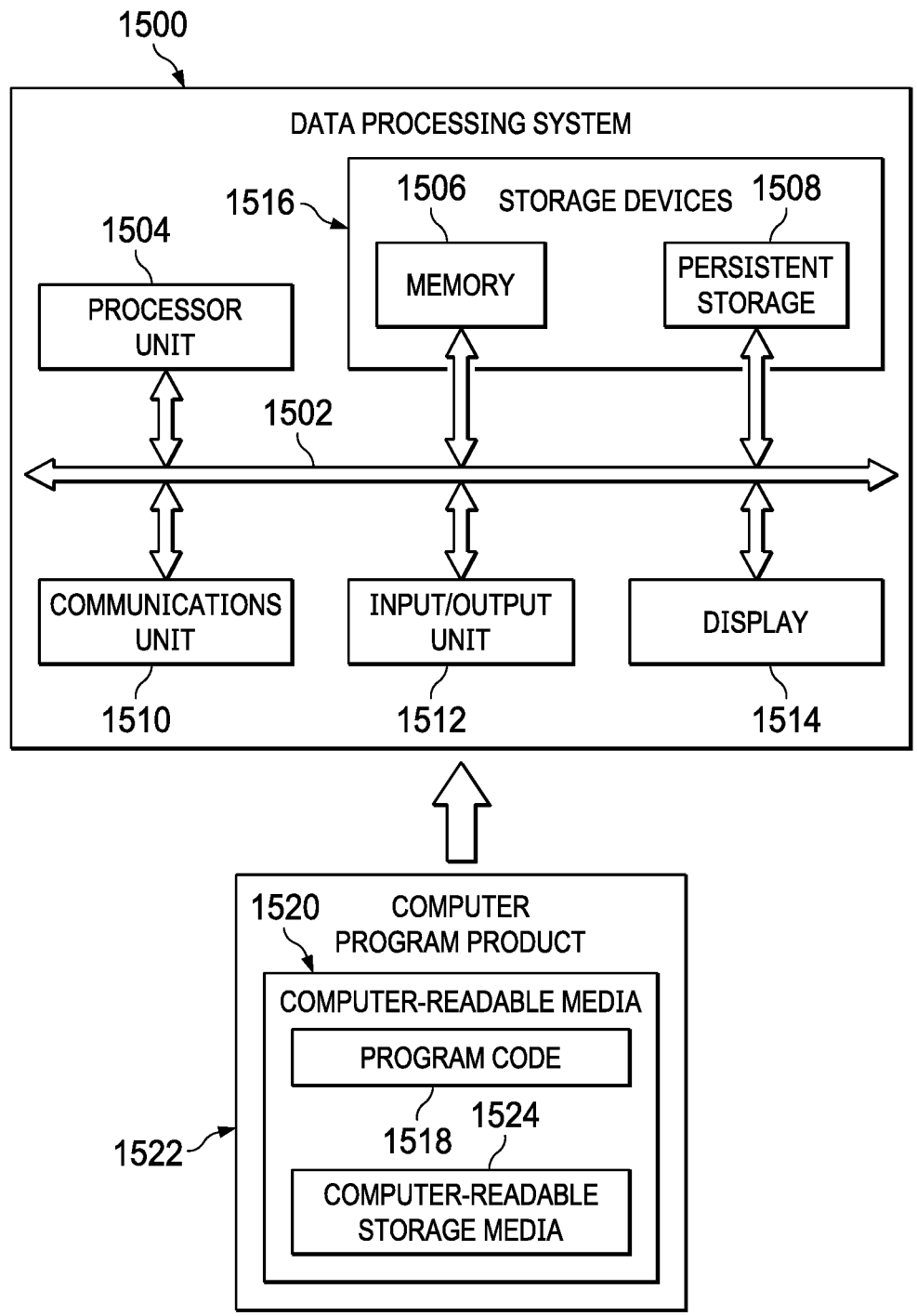
FIG. 15 is a block diagram of a data processing system in accordance with an illustrative embodiment.

Turning now to FIG. 15, a block diagram of a data processing system is depicted in accordance with an illustrative embodiment. Data processing system 1500 can be used to implement server computer 104, server computer 106, client devices 110, in FIG. 1. Data processing system 1500 can also be used to implement computer system 206 in FIG. 2.

In this illustrative example, data processing system 1500 includes communications framework 1502, which provides communications between processor unit 1504, memory 1506, persistent storage 1508, communications unit 1510, input/output (I/O) unit 1512, and display 1514. In this example, communications framework 1502 takes the form of a bus system.

Processor unit 1504 serves to execute instructions for software that can be loaded into memory 1506. Processor unit 1504 includes one or more processors. For example, processor unit 1504 can be selected from at least one of a multicore processor, a central processing unit (CPU), a graphics processing unit (GPU), a physics processing unit (PPU), a digital signal processor (DSP), a network processor, or some other suitable type of processor.

Memory 1506 and persistent storage 1508 are examples of storage devices 1516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1516 may also be referred to as computer-readable storage devices in these illustrative examples. Memory 1506, in these examples, can be, for example, a random-access memory or any other suitable volatile or non-volatile storage device. Persistent storage 1508 may take various forms, depending on the particular implementation.

For example, persistent storage 1508 may contain one or more components or devices. For example, persistent storage 1508 can be a hard drive, a solid-state drive (SSD), a flash memory, a rewritable optical disk, a rewritable magnetic tape, or some combination of the above. The media used by persistent storage 1508 also can be removable. For example, a removable hard drive can be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that can be connected to data processing system 1500. For example, input/output unit 1512 may provide a connection for user input through at least one of a keyboard, a mouse, or some other suitable input device. Further, input/output unit 1512 may send output to a printer. Display 1514 provides a mechanism to display information to a user.

Instructions for at least one of the operating system, applications, or programs can be located in storage devices 1516, which are in communication with processor unit 1504 through communications framework 1502. The processes of the different embodiments can be performed by processor unit 1504 using computer-implemented instructions, which may be located in a memory, such as memory 1506.

These instructions are referred to as program code, computer usable program code, or computer-readable program code that can be read and executed by a processor in processor unit 1504. The program code in the different embodiments can be embodied on different physical or computer-readable storage media, such as memory 1506 or persistent storage 1508.

Program code 1518 is located in a functional form on computer-readable media 1520 that is selectively removable and can be loaded onto or transferred to data processing system 1500 for execution by processor unit 1504. Program code 1518 and computer-readable media 1520 form computer program product 1522 in these illustrative examples. In the illustrative example, computer-readable media 1520 is computer-readable storage media 1524.

In these illustrative examples, computer-readable storage media 1524 is a physical or tangible storage device used to store program code 1518 rather than a medium that propagates or transmits program code 1518. The term "non-transitory" or "tangible", as used herein, is a limitation of the medium itself (i.e., tangible, not a signal) as opposed to a limitation on data storage persistency (e.g., RAM vs. ROM).

Alternatively, program code 1518 can be transferred to data processing system 1500 using a computer-readable signal media. The computer-readable signal media can be, for example, a propagated data signal containing program code 1518. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media" can be singular or plural. For example, program code 1518 can be located in computer-readable media 1520 in the form of a single storage device or system. In another example, program code 1518 can be located in computer-readable media 1520 that is distributed in multiple data processing systems. In other words, some instructions in program code 1518 can be located in one data processing system while other instructions in program code 1518 can be located in one data processing system. For example, a portion of program code 1518 can be located in computer-readable media 1520 in a server computer while another portion of program code 1518 can be located in computer-readable media 1520 located in a set of client computers.

The different components illustrated for data processing system 1500 are not meant to provide architectural limitations to the manner in which different embodiments can be implemented. The different illustrative embodiments can be implemented in a data processing system including components in addition to or in place of those illustrated for data processing system 1500. Other components shown in FIG. 15 can be varied from the illustrative examples shown. The different embodiments can be implemented using any hardware device or system capable of running program code 1518.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, memory 1506, or portions thereof, may be incorporated in processor unit 1504 in some illustrative examples.

Thus, illustrative embodiments provide method, system, and computer program product for verifying benefit information for an employer-provided benefit plan. A computer system verifies employee enrollments in the benefit plan. Verifying employee enrollments includes receiving an employee identifier in a first panel of a graphical user interface, identifying an employee associated with the employee identifier, identifying employee enrollments of the employee, and displaying the employee enrollments in the first panel. The computer system verifies plan benefits for the benefit plan. Verifying plan benefits includes receiving a plan identifier in a second panel of the graphical user interface, identifying the plan benefits based on the plan identifier, and displaying the plan benefits in the second panel. The computer system verifies plan membership. Verifying plan membership includes receiving a personal identifier in a third panel of the graphical user interface, identifying the plan identifier based on the personal identifier, and displaying the plan identifier in the third panel.

In the illustrative example, the use of benefit verifier 202 in computer system 206 integrates processes into a practical application for verifying benefit information for an employer-provided benefit plan in a manner that increases the performance of computer system 206. For example, benefit verifier 202 overcomes a technical problem of verifying benefit information for an employer-provided benefit plan. In one illustrative example, providing a verifying benefit information for an employer-provided benefit plan enables a business service specialist to more quickly and easily resolve issues due to automatic write over employee enrollments from a prior plan year.

In other words, benefit verifier 202 in computer system 206 is directed to a practical application of processes integrated into benefit verifier 202 in computer system 206 that provides verification of benefit information for an employer-provided benefit plan. As a result, Benefit verifier 202 improves customer service by increasing the likelihood of one call resolution while also improving data accuracy across all markets. Additional, Benefit verifier 202 reduces the likelihood of downstream cases due to wrong or incorrectly worked plan benefits and employee enrollments therein.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for verifying benefit information for an employer-provided benefit plan, the method comprising:
   providing, by a data processing system comprising one or more hardware processors, for display on a display device, a graphical user interface comprising a first panel, a second panel and a third panel that are each visible via the graphical user interface and configured to interact with one another;
   verifying, by the data processing system, employee-enrollments in a benefit plan, including:
      receiving, via the graphical user interface and over a network from a client device remote from the data processing system, an employee-identifier in the first panel of the graphical user interface;
      identifying an employee associated with the employee-identifier;
      identifying employee-enrollments of the employee; and
      displaying the employee-enrollments in the first panel of the graphical user interface;
   verifying, by the data processing system, plan benefits for the benefit plan, including:
      receiving, via the graphical user interface and over the network from the client device, a plan-identifier in the second panel of the graphical user interface;
      identifying the plan benefits based on the plan-identifier; and
      displaying the plan benefits in the second panel of the graphical user interface;
   verifying, by the data processing system, plan membership, including:
      receiving, via the graphical user interface and over the network from the client device, a personal-identifier in the third panel of the graphical user interface;
      identifying the plan-identifier based on the personal-identifier; and
      displaying the plan-identifier in the third panel of the graphical user interface;
   determining, by the data processing system, differences between the benefit plan and a previous benefit plan; and
   updating, by the data processing system responsive to selecting a control in the graphical user interface and determining the differences, the graphical user interface to include an arrangement of graphical elements that display and identify the differences between the benefit plan and the previous benefit plan.

2. The method of claim 1, further comprising:
   identifying carrier contact information based on information received in the first panel, the second panel, the third panel, or combinations thereof; and
   displaying the carrier contact information in a fourth panel of the graphical user interface.

3. The method of claim 1, wherein verifying the employee enrollments further comprises:
   receiving user input selecting a control in the first panel; and
   displaying the employee enrollments in response to receiving the user input.

4. The method of claim 1, wherein verifying the employee enrollments further comprises:
   identifying a previous enrollment of the employee in the benefit plan;
   identifying a current enrollment of the employee in the benefit plan; and
   displaying a comparison between the current enrollment and the previous enrollment in the first panel of the graphical user interface.

5. The method of claim 4, wherein displaying the comparison further comprises:
   receiving user input selecting a control in the first panel; and
   displaying the comparison in response to receiving the user input.

6. The method of claim 4, wherein identifying a previous enrollment of the employee further comprises:
   identifying a previous coverage level in the benefit plan;
   wherein identifying the current enrollment of the employee further comprises:
      identifying a current coverage level in the benefit plan; and
      wherein displaying the comparison between the current enrollment and the previous enrollment further comprises:
         displaying a comparison between the current coverage level and the previous coverage level.

7. The method of claim 4, further comprising:
   generating the current enrollment by performing a write-over of the previous enrollment of a prior plan year; and
   identifying a lapse in the employee enrollments caused by the write-over; and
   wherein displaying the comparison between the current enrollment in the previous enrollment further comprises:
      displaying the lapse in the employee enrollments in the first panel of the graphical user interface.

8. A benefit verification system comprising:
   a computer system comprising one or more hardware processors; and
   a benefit verifier in the computer system, wherein the benefit verifier operates:
   to provide, for display on a display device, a graphical user interface comprising a first panel, a second panel and a third panel that are each visible via the graphical user interface aid configured to interact with one another;
   to verify employee-enrollments in a benefit plan, including:
      receiving, over a network from a client device remote from the computer system, an employee-identifier in the first panel of the graphical user interface;

identifying an employee associated with the employee-identifier;
identifying employee-enrollments of the employee; and
displaying the employee-enrollments in the first panel of the graphical user interface;
to verify plan benefits for the benefit plan, including:
receiving, over the network from the client device, a plan-identifier in the second panel of the graphical user interface;
identifying the plan benefits based on the plan-identifier; and
displaying the plan benefits in the second panel of the graphical user interface;
to verify plan membership, including:
receiving, over the network from the client device, a personal-identifier in the third panel of the graphical user interface;
identifying the plan-identifier based on the personal-identifier; and
displaying the plan-identifier in the third panel of the graphical user interface;
to determine differences between the benefit plan and a previous benefit plan; and
to update, responsive to selection of a control in the graphical user interface and determination of the differences, the graphical user interface to include an arrangement of graphical elements that display and identify the differences between the benefit plan and the previous benefit plan.

9. The benefit verification system of claim 8, wherein the benefit verifier further operates:
to identify carrier contact information based on information received in the first panel, the second panel, the third panel, or combinations thereof; and
to display the carrier contact information in a fourth panel of the graphical user interface.

10. The benefit verification system of claim 8, wherein in verifying the employee enrollments, the benefit verifier further operates:
to receive user input selecting a control in the first panel; and
to display the employee enrollments in response to receiving the user input.

11. The benefit verification system of claim 8, wherein in verifying the employee enrollments, the benefit verifier further operates:
to identify a previous enrollment of the employee in the benefit plan;
to identify a current enrollment of the employee in the benefit plan; and
to display a comparison between the current enrollment and the previous enrollment in the first panel of the graphical user interface.

12. The benefit verification system of claim 11, wherein in displaying the comparison, the benefit verifier further operates:
to receive user input selecting a control in the first panel; and
to display the comparison in response to receiving the user input.

13. The benefit verification system of claim 11, wherein in identifying a previous enrollment of the employee, the benefit verifier further operates:
to identify a previous coverage level in the benefit plan;
wherein in identifying the current enrollment of the employee, the benefit verifier further operates:
to identify a current coverage level in the benefit plan; and
wherein in displaying the comparison between the current enrollment and the previous enrollment, the benefit verifier further operates:
to display a comparison between the current coverage level and the previous coverage level.

14. The benefit verification system of claim 11, wherein the benefit verifier further operates:
to generate the current enrollment by performing a write-over of the previous enrollment of a prior plan year; and
to identify a lapse in the employee enrollments caused by the write-over; and
wherein in displaying the comparison between the current enrollment in the previous enrollment, the benefit verifier further operates:
to display the lapse in the employee enrollments in the first panel of the graphical user interface.

15. A computer program product for verifying benefit information for an employer-provided benefit plan, the computer program product comprising:
a non-transitory computer readable storage media;
program code, stored on the non-transitory computer readable storage media, for verifying employee-enrollments in the benefit plan, including:
code for providing, for display on a display device, a graphical user interface comprising a first panel, a second panel and a third panel that are each visible via the graphical user interface and configured to interact with one another;
code for receiving, over a network from a client device, an employee-identifier in the first panel of the graphical user interface;
code for identifying an employee associated with the employee-identifier;
code for identifying employee-enrollments of the employee; and
code for displaying the employee-enrollments in the first panel of the graphical user interface;
program code, stored on the non-transitory computer readable storage media, for verifying plan benefits for the benefit plan, including:
code for receiving, over the network from the client device, a plan-identifier in the second panel of the graphical user interface;
code for identifying the plan benefits based on the plan-identifier; and
code for displaying the plan benefits in the second panel of the graphical user interface;
program code, stored on the non-transitory computer readable storage media, for verifying plan membership, including:
code for receiving, over the network from the client device, a personal-identifier in the third panel of the graphical user interface;
code for identifying the plan-identifier based on the personal-identifier; and
code for displaying the plan-identifier in the third panel of the graphical user interface;
program code, stored on the non-transitory computer readable storage media, for determining differences between the benefit plan and a previous benefit plan; and
program code, stored on the non-transitory computer readable storage media for updating, responsive to selecting a control in the graphical user interface and determining the differences, the graphical user interface to include an arrangement of graphical elements that display and identify the differences between the benefit plan and the previous benefit plan.

16. The computer program product of claim 15, further comprising:
   program code, stored on the non-transitory computer readable storage media, for identifying carrier contact information based on information received in the first panel, the second panel, the third panel, or combinations thereof; and
   program code, stored on the non-transitory computer readable storage media, for displaying the carrier contact information in a fourth panel of the graphical user interface.

17. The computer program product of claim 15, wherein the program code for verifying the employee enrollments further comprises:
   code for receiving user input selecting a control in the first panel; and
   code for displaying the employee enrollments in response to receiving the user input.

18. The computer program product of claim 15, wherein the program code for verifying the employee enrollments further comprises:
   code for identifying a previous enrollment of the employee in the benefit plan;
   code for identifying a current enrollment of the employee in the benefit plan; and
   code for displaying a comparison between the current enrollment and the previous enrollment in the first panel of the graphical user interface.

19. The computer program product of claim 18, wherein the program code for displaying the comparison further comprises:
   code for receiving user input selecting a control in the first panel; and
   code for displaying the comparison in response to receiving the user input.

20. The computer program product of claim 18, wherein the program code for identifying a previous enrollment of the employee further comprises:
   code for identifying a previous coverage level in the benefit plan;
   wherein the program code for identifying the current enrollment of the employee further comprises:
      code for identifying a current coverage level in the benefit plan; and
   wherein the program code for displaying the comparison between the current enrollment and the previous enrollment further comprises:
      code for displaying a comparison between the current coverage level and the previous coverage level.

21. The computer program product of claim 18, further comprising:
   program code, stored on the non-transitory computer readable storage media, for generating the current enrollment by performing a write-over of the previous enrollment of a prior plan year; and
   program code, stored on the non-transitory computer readable storage media, for identifying a lapse in the employee enrollments caused by the write-over; and
   wherein program code for displaying the comparison between the current enrollment in the previous enrollment further comprises:
      code for displaying the lapse in the employee enrollments in the first panel of the graphical user interface.

* * * * *